United States Patent Office 3,341,429
Patented Sept. 12, 1967

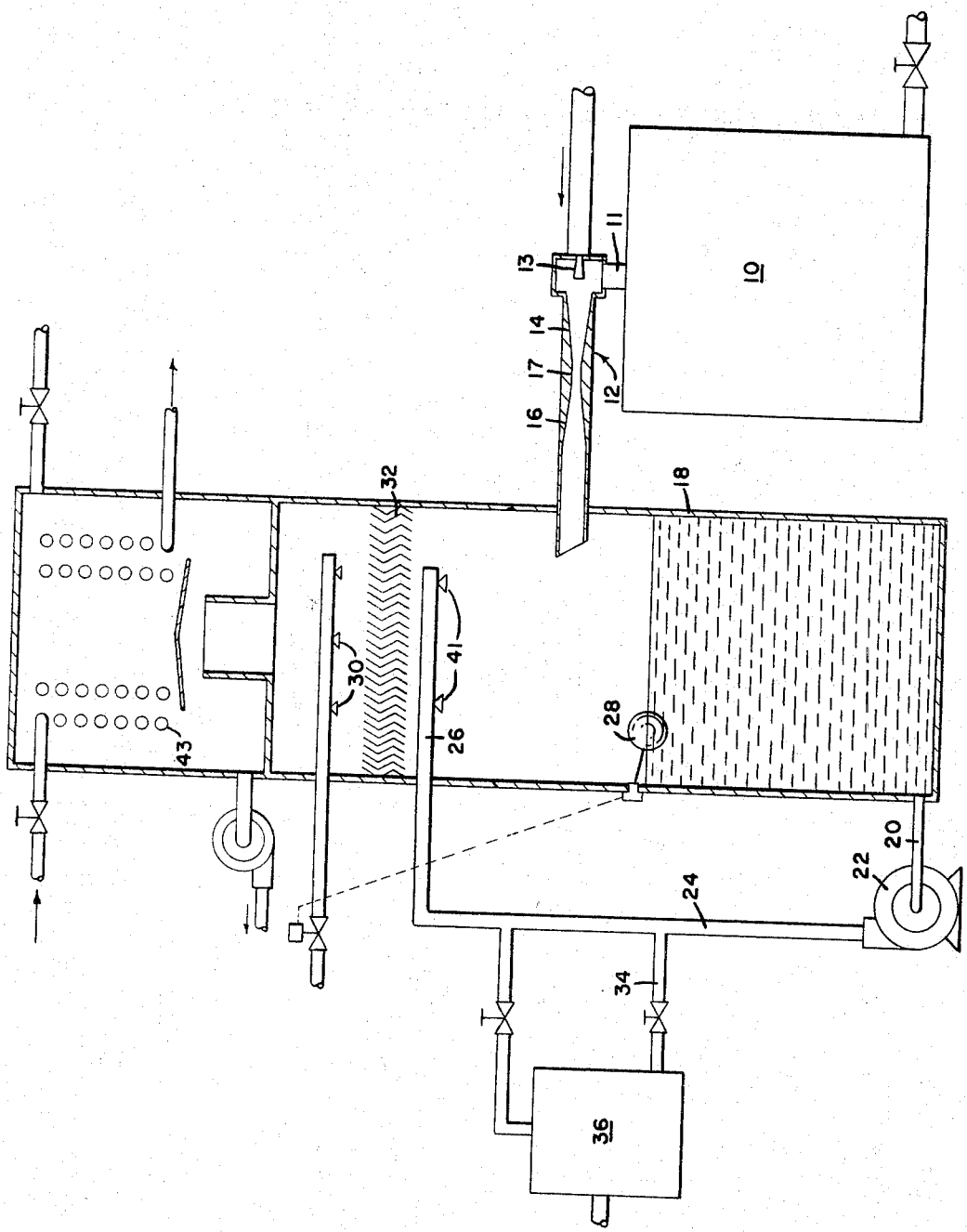

3,341,429
FLUID RECOVERY SYSTEM WITH IMPROVED ENTRAINMENT LOSS PREVENTION MEANS
Victor V. Fondrk, Jeannette, Pa., assignor to Carrier Corporation, Syracuse, N.Y., a corporation of Delaware
Filed Apr. 2, 1962, Ser. No. 184,295
3 Claims. (Cl. 203—95)

This invention relates to the separation and recovery of a fluid which is a constituent of a body of liquid composed of a plurality of fluids. More particularly, this invention relates to the separation, from a body of liquid composed of a plurality of fluid constituents, of one of the fluids by subjecting the body of liquid to a partial vacuum of an order sufficient to cause vaporization of the fluid to be separated.

This invention relates to the separation and recovery of a fluid of the kind under consideration through a process including vaporization of the separated fluid combined with subsequent condensation of the separated fluid at a location remote from the location at which vaporization was effected. The chief object of this invention is the provision of a process of the type described wherein the separated fluid is subsequently condensed under circumstances where loss of the fluid by entrainment, or otherwise, is maintained at a minimum level.

Another object of the invention is the provision of an improved apparatus for separating and recovering a fluid from a body of liquid wherein a novel combination of structural elements is utilized for the purpose of assuring as great a percentage of recovery as possible.

A still further object of the invention is the provision of an improved method of separating a fluid from a mixture of fluids wherein a relatively high pressure motive gaseous fluid is employed to reduce the pressure within a vessel containing the mixture to an extent that vaporization of the fluid to be separated occurs. The improved method is further characterized by utilizing the high pressure gaseous fluid to induce the flow of vaporous fluid from the vessel and propel it to a location where it may be separated from the motive fluid by condensation.

An additional object of the invention is the provision of an improved apparatus for separation and recovering fluids in the manner described wherein means are provided for preventing loss of the condensed fluid by entrainment in the motive fluid which remains in the vapor phase as the separated fluid is condensed.

A further object of the invention is the provision of an improved apparatus for recovering the separated fluid constituent wherein the separated fluid in the gaseous phase is passed in direct heat transfer relation with a stream of water flowing in a circuit. The heat transfer action is conducted in an enclosure the pressure within which is regulated so that only the separated fluid is condensed.

These and other objects of the invention will be apparent upon a consideration of the ensuing specification and drawing wherein:

The figure is a diagrammatic representation of an apparatus constructed in accordance with the invention and capable of performing the process serving as the invention.

Referring more particularly to the drawing, there is shown a tank or receptacle 10 for the storage of a body of liquid composed of a number of different fluids which may or may not be a true solution but which may be classified for the purpose of illustrating the invention as a mixture. This invention relates to the separation from the body of liquid in the tank of one of the fluids forming the liquid accumulation stored in the tank.

To this end, there is provided a conduit 12 having a branch 11 connected to the top of the tank 10 and which is shaped so as to include a section 14 having converging walls and a section 16 wherein the wall forming the side of the conduit diverges defining a throat section 17. Located at the entrance of conduit 12 is a nozzle member 13 provided for the purpose of supplying a motive fluid such as steam under relatively high pressure to the conduit 12. The nozzle is so arranged in connection with the conduit 11 as to draw a vacuum in the tank 10 of an order sufficient to cause the fluid to be separated to vaporize and flow under the influence of the high velocity steam jet with the steam to a separation column 18.

The action described causes the vaporized fluid to mix with steam and flow into the separation column maintained under a predetermined pressure, in a manner to be later described, for flow in heat transfer relation with a fluid such as water.

Referring to the drawing, it will be seen that the lower portion of the separation column accommodates a body of water which is circulated in the column in a circuit including a line 20, pump 22, delivery line 24 and supply header 26 for return to the lower portion of the column. A float 28 regulates a valve permitting make-up water to be discharged into the column through a series of nozzles 30 disposed above a baffle 32 for a purpose to be later described.

The gaseous fluid directed to the separation column through conduit 11 flows upwardly through the column in direct heat transfer relation with the water issuing in spray form from nozzles 41 connected to header 26. The pressure within the separation column is maintained by regulating the flow of cooling medium through a condenser 43 disposed in the top section of the separation column. The pressure maintained within the column is such that the heat of condensation developed as the separated fluid condenses causes a portion of the water issuing from nozzles 41 to vaporize and flow with the steam to the upper portion of the condenser where it is liquefied through the action of the condenser. The make-up water introduced into the column through the action of the float valve compensates for this loss of water flowing in the water circuit. The pressure within column 18 is saturation pressure corresponding to the temperature of the water flowing in the water circuit. Suitable controls, not shown, are utilized to regulate the flow of cooling medium.

As the separated fluid condenses it gravitates to the bottom of the separation column and is delivered, together with the water, by the action of the pump through the path defined by the water circuit. Conduit 34 is provided to serve as a connection between the water circuit and a centrifuge 36 where the separated liquid is centrifuged from the water and recovered in a separate vessel. In order that the pressure within the separation column be maintained at equilibrium conditions a purge unit, not shown, is provided in order to dispose of noncondensible gases.

It will be apparent that a tendency for particles of the separated liquid to flow under the influence of the motive steam into the upper portion of the column exists. The baffles 32 are provided for the purpose of recovering the separated liquid from the steam or vapor flow. It is to be noted that the nozzles supplying the make-up water to the water circuit are arranged above the baffles so as to flush from the surface of the baffles the separated liquid adhering thereto. With the construction shown a very high degree of separation and recovery of the fluid is attained. With the apparatus disclosed and the method described, it is possible to recover acidic components of the kind found in the solution of vegetable oil in a very efficient manner. The invention, it will be apparent, may be employed to recover any desired liquid component of a body of fluids in the liquid state that may reside in the tank 10. It is necessary only to vary the vapor pressure in accordance with the particular fluid that it is desired to separate. The process is most effective to separate fluid components in an order depending on their vapor pressure. For example, the constituent having the highest vapor pressure should be separated first.

While I have described a preferred embodiment of my invention, it will be understood it is not limited thereto, but may be otherwise embodied within the scope of the following claims.

I claim:

1. The process of separating and recovering a constituent of a liquid mixture which comprises the steps of; utilizing a stream of high velocity motive fluid to create a low pressure within a chamber containing the mixture such that the constituent is evaporated and is induced to flow from the chamber by the action of the motive fluid, introducing the gaseous mixture of motive fluid and constituent into a separation column, continuously circulating contact liquid through a circuit including a sump in the vessel, a spray header disposed in spaced relation to said sump and a zone between said sump and header wherein the contact liquid flows in direct contact heat transfer relation with the gas being supplied to the vessel, causing the gaseous constituent to condense, go into solution, or be physically entrained, and gravitate to said sump, regulating the pressure within said column such that the heat liberated in the separation of the constituent from the motive fluid is adsorbed by the circulating contact liquid causing portions thereof to evaporate, collecting any constituents entrained in the flow of motive fluid within the vessel, providing quantities of contact liquid to the circulating flow to compensate for that vaporized, utilizing the quantities of contact liquid so supplied to wash the collected constituents into the circulating flow and periodically withdrawing portions of constituent and contact liquid mixture in said circuit, and externally separating constituent and contact liquid, returning contact liquid to the system and recovering or disposing of the constituent.

2. The process of separating and recovering vegetable oils immiscible with water from a mixture including the vegetable oil as a constituent, which comprises the steps of; utilizing a stream of high velocity steam to create a low pressure within a chamber containing the mixture such that the vegetable oil is evaporated and is induced to flow from the chamber by the action of the steam, introducing the gaseous mixture of steam and vegetable oil into a separation column, continuously circulating water through a circuit including a sump in the vessel, a spray header disposed in spaced relation to said sump and a zone between said sump and header wherein the water flows in direct contact heat transfer relation with the gas being supplied to the vessel, causing the gaseous vegetable oil to condense and gravitate to said sump, regulating the pressure within said vessel such that the heat liberated in the condensation of the vegetable oil is absorbed by the circulating water, causing portions thereof to evaporate, collecting any condensed oils entrained in the flow of steam within the vessel, providing quantities of water to the circulating flow to compensate for that vaporized, utilizing the quantities of water so supplied to wash the collected oils into the circulating flow and periodically centifuging the water and oils in said circuit to remove the oils therefrom.

3. Apparatus for the separation and recovery of a liquid constituent of a body of fluid comprising a plurality of liquid constituents, said apparatus including means forming a receptacle for the storage of said body of fluid, a separation column located remote from said liquid receptacle means, conduit means connecting said liquid receptacle and said separation column, means for supplying high velocity motive fluid to said conduit means to reduce the pressure in said receptacle below the vapor pressure of the liquid constituent to be separated whereby said liquid evaporates and flows through said conduit means to the separation column under the influence of the motive fluid, means for circulating a heat transfer medium within said column in heat exchange relation with fluid entering the column from the conduit means to condense the separated vapor from the motive fluid, eliminators to separate condensate formed in the column and entrained in the flow of motive fluid through said column, means for replacing heat transfer medium vaporized by the latent heat of condensation in said column, said means including a conduit connected to a supply of heat transfer medium, nozzle means disposed above said eliminators to flush the surfaces of said eliminators, and a control for the flow of heat transfer medium through said conduit to said nozzle means, means for collecting the condensate and heat transfer medium in the column, and means for recovering the condensate from the collected heat transfer medium.

References Cited

UNITED STATES PATENTS

| | | | |
|---|---|---|---|
| 389,160 | 9/1888 | Marr | 202—185.2 X |
| 2,224,984 | 12/1940 | Potts | 202—52 X |
| 2,441,361 | 5/1948 | Kirgan | 202—75 |
| 2,461,694 | 2/1949 | McCubbin et al. | 202—52 |
| 2,489,703 | 11/1949 | Cook et al. | 202—52 |
| 2,625,505 | 1/1953 | Cross | 202—52 |
| 2,682,499 | 6/1954 | Thurman | 202—205 |
| 2,905,731 | 9/1959 | Seed | 202—52 X |
| 3,061,622 | 10/1962 | Fiala | 260—428 |

NORMAN YUDKOFF, *Primary Examiner.*

W. L. BASCOMB, J. B. DONIHEE, D. EDWARDS,
*Assistant Examiners.*